US008103102B2

(12) United States Patent
Chien et al.

(10) Patent No.: US 8,103,102 B2
(45) Date of Patent: Jan. 24, 2012

(54) ROBUST FEATURE EXTRACTION FOR COLOR AND GRAYSCALE IMAGES

(75) Inventors: Jen-Chan Chien, Saratoga, CA (US); Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1092 days.

(21) Appl. No.: 11/638,994

(22) Filed: Dec. 13, 2006

(65) Prior Publication Data
US 2008/0144932 A1   Jun. 19, 2008

(51) Int. Cl.
*G06K 9/46* (2006.01)
(52) U.S. Cl. ....................................................... 382/190
(58) Field of Classification Search .................. None
See application file for complete search history.

(56) References Cited

U.S. PATENT DOCUMENTS

| | | | | |
|---|---|---|---|---|
| 5,734,426 | A * | 3/1998 | Dong | 348/297 |
| 6,137,909 | A * | 10/2000 | Greineder et al. | 382/190 |
| 6,711,293 | B1 | 3/2004 | Lowe | |
| 6,804,683 | B1* | 10/2004 | Matsuzaki et al. | 1/1 |
| 6,915,008 | B2 * | 7/2005 | Barman et al. | 382/154 |
| 7,657,100 | B2 * | 2/2010 | Gokturk et al. | 382/209 |
| 7,660,464 | B1 * | 2/2010 | Peterson | 382/181 |
| 2002/0146176 | A1 | 10/2002 | Meyers | |
| 2003/0098914 | A1* | 5/2003 | Easwar | 348/229.1 |
| 2005/0047647 | A1* | 3/2005 | Rutishauser et al. | 382/159 |

FOREIGN PATENT DOCUMENTS
EP   1569170   8/2005

OTHER PUBLICATIONS

Meerwald et al. (Apr. 2002) "Parallel JPEG2000 Image Coding on Multiprocessors." Proc. Int'l Parallel and Distributed Processing Symposium, vol. 1 pp. 2-7.*
Willems, G. (2005) "Matching of textured 3d-range data using SIFT features." Master's Thesis, Katholieke Universiteit Leuven.*
Mann et al. (May 1995) "On being 'undigital' with digital cameras: Extending dynamic range by combining differently exposed pictures." Soc. for Imaging Science and Technology 48th Annual Conference, pp. 422-428.*
Tomaszewska et al. (Feb. 2007) "Image registration for multi-exposure high dynamic range image acquisition." Proc. 15th Int'l Conf. in Central Europe on Computer Graphics, Visualization, and Computer Vision, pp. 49-56.*
Russ, J.C. (2002) "The Image Processing Handbook." 4th Ed. CRC Press, Ch. 3.*
Gooch et al. (Aug. 2005) "Color2Gray: Salience-preserving color removal." Proc. Int'l Conf. on Computer Graphics and Interactive Techniques, pp. 634-639.*
Grundland et al. (Oct. 2005) "The decolorize algorithm for contrast enhancing, color to grayscale conversion." Univ. of Cambridge Computer Laboratory Technical Report 649.*

(Continued)

*Primary Examiner* — Bhavesh Mehta
*Assistant Examiner* — Barry Drennan
(74) *Attorney, Agent, or Firm* — Fish & Richardson P.C.

(57) ABSTRACT

Systems, methods and program products for converting a first image to an intensity image using principal components analysis where the intensity image is based on a first principal component. The intensity image is analyzed to identify a plurality of scale invariant features in the intensity image, each identified feature associated with a score. An adaptive threshold is applied to the identified features to establish a set of features for the first image.

46 Claims, 9 Drawing Sheets
(4 of 9 Drawing Sheet(s) Filed in Color)

OTHER PUBLICATIONS

Brown et al. (2003) "Recognising panoramas." Proc. 9$^{th}$ IEEE Int'l Conf. on Computer Vision, pp. 1218-1225.*

Mikolajczyk, K. et al. "A Performance Evaluation of Local Descriptors," IEEE Transactions on Pattern Analysis and Machine Intelligence, IEEE Service Center, Los Alamitos, CA, U.S., vol. 27, No. 10, Oct. 2005, pp. 1615-1630.

Zingaretti, P. et al., "Vision and Sonar Sensor Fusion for Mobile Robot Localizaton in Aliased Environments," 2006 IEEE/ASME International Conference on Mechatronics and Embedded Systems and Applications, New Jersey, U.S., Aug. 13, 2006, pp. 1-6.

International Search Report for PCT Application No. PCT/US2007/086873.

International Report on Patentability for PCT Application No. PCT/US2007/086873, dated Jun. 16, 2009, 9 pages.

Reinhard et al., High Dynamic Range Imaging, 2006, Morgan Kaufmann Publisher, San Francisco, CA.

Cordelia Schmid, et al., "Evaluation of Interest Point Detectors," International Journal of Computer Vision 37(2), pp. 151-172, © 2000 Kluwer Academic Publishers.

David G. Lowe, "Local Feature View Clustering for #d Object Recognition," Proc. of the IEEE Conference on Computer Vision and Pattern Recognition, Dec. 2001, 7 pages.

David G. Lowe, "Distinctive Image Features from Scale-Invariant Keypoints," Accepted for publication in the International Journal of Computer Vision, 2004, 28 pages.

David G. Lowe, "Object Recognition from Local Scale-Invariant Features," Proc. of the International Conference on Computer Vision, Sep. 1999, 8 pages.

* cited by examiner

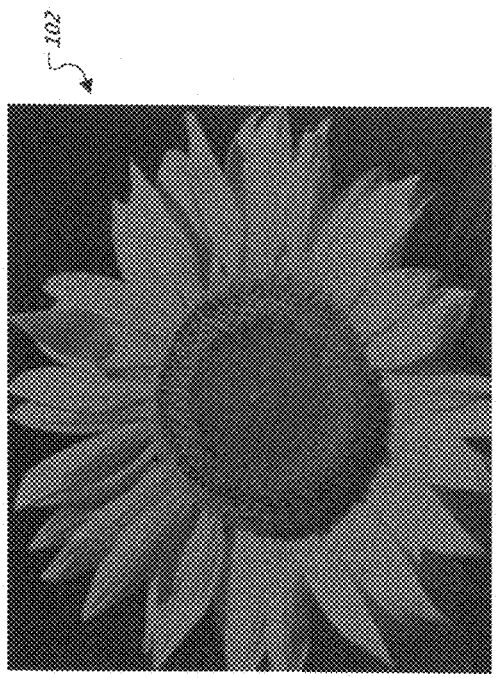
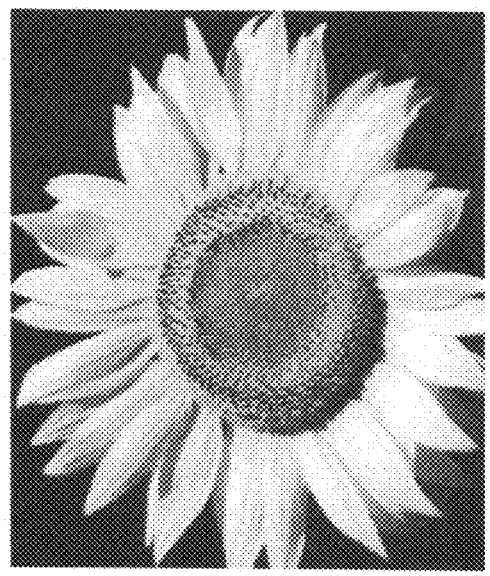
FIG. 1

ROBUST FEATURE EXTRACTION FOR COLOR AND GRAYSCALE IMAGES

BACKGROUND

The present disclosure relates to software and, more particularly, to feature detection in images.

Feature detection is commonly used to merge multiple images into a single High Dynamic Range (HDR) image and for image "stitching" where two or more images are joined together along one or more borders. Merging and stitching depend on identification of common features in the images being manipulated in order to properly align the images. Generally speaking, image alignment can be done by first extracting distinctive features from each image to be aligned, establishing feature correspondence among the images, and then determining the geometric transformation to bring each image into alignment. For example, if images of a specific nature scene are captured by different cameras, common features in each image (e.g., an edge of a rock) can be used to transform the images to a common coordinate system so that a composite image can be created.

Representative feature extracting algorithms operate on grayscale or "intensity" images. For color images, the luminance channel is often used for feature extraction. When the luminance channel is not available, some algorithms use a single image color channel. For instance, the green channel in a Red, Green, Blue (RGB) image can be used as an approximation of an intensity image. But such images may not be robust against image noise or sensitive enough to preserve structures present in the image, including those structures that are present across different color channels. Additionally, typical feature exaction algorithms use fixed thresholds to select features which are commonly tuned to work well with images under normal exposure conditions. However, for under-exposed or over-exposed images—common for High Dynamic Range (HDR) images—the algorithms can perform poorly.

SUMMARY

This specification describes technologies relating to feature detection in images.

In general, one aspect of the subject matter described in this specification can be embodied in a method that includes converting a first image to an intensity image using principal components analysis where the intensity image is based on a first principal component. The intensity image is analyzed to identify a plurality of scale invariant features in the intensity image, each identified feature associated with a score. An adaptive threshold is applied to the identified features to establish a set of features for the first image. Other embodiments of this aspect include corresponding systems, apparatus, and computer program products.

These and other embodiments can optionally include one or more of the following features. The intensity image can include a plurality of pixels and each pixel is associated with a respective intensity value, the method further comprising: 1) determining a number of pixels in the intensity image that represent underexposed or overexposed areas of the first image based on the respective intensity values; and 2) if the number of pixels is above a threshold, scaling the respective intensity values of the plurality of pixels to a middle intensity value. Applying the threshold can include discarding identified features whose respective scores are below a threshold. Applying the threshold can include determining a desired number of features based on a size of the first image and keeping the desired number of identified features whose respective scores are highest.

The first image is a lower resolution version of a second image and the set of features is mapped from the first image to the second image. A non-constant tile is identified in a second image and the non-constant tile is used as the first image. The first image is a non-constant tile in a second image, the second imaging being larger than the first image. The first image is in one of the following color spaces: RGB, CIE L*a*b*, CMYK, HSL, HVL, grayscale, or black and white. The first image includes a plurality of tiles and the method of claim 1 is performed on each tile in parallel. The adaptive threshold can be applied to each tile independently. User selection of one or more regions of the first image is accepted. Features detected in the one or more regions are associated with a priority; the one or more regions indicate one or more areas of the first image where feature detection will or will not be performed; or the one or more regions indicate one or more areas of the first image where features will be given priority when applying the adaptive threshold.

In general, one aspect of the subject matter described in this specification can be embodied in a method that includes converting a first CIE L*a*b* image to an intensity image using an L* component of the image. The intensity image is analyzed to identify a plurality of scale invariant features in the intensity image, each identified feature associated with a score. An adaptive threshold is applied to the identified features to establish a set of features for the first image. Other embodiments of this aspect include corresponding systems, apparatus, and computer program products.

These and other embodiments can optionally include one or more of the following features. The intensity image can include a plurality of pixels and each pixel is associated with a respective intensity value, the method further comprising: 1) determining a number of pixels in the intensity image that represent underexposed or overexposed areas of the first image based on the respective intensity values; and 2) if the number of pixels is above a threshold, scaling the respective intensity values of the plurality of pixels to a middle intensity value. Applying the threshold can include discarding identified features whose respective scores are below a threshold. Applying the threshold can include determining a desired number of features based on a size of the first image and keeping the desired number of identified features whose respective scores are highest.

The first image is a lower resolution version of a second image and the set of features is mapped from the first image to the second image. A non-constant tile is identified in a second image and the non-constant tile is used as the first image. The first image is a non-constant tile in a second image, the second imaging being larger than the first image. The first image includes a plurality of tiles and the method of claim 1 is performed on each tile in parallel. The adaptive threshold can be applied to each tile independently. User selection of one or more regions of the first image is accepted. Features detected in the one or more regions are associated with a priority; the one or more regions indicate one or more areas of the first image where feature detection will or will not be performed; or the one or more regions indicate one or more areas of the first image where features will be given priority when applying the adaptive threshold.

Particular implementations of the subject matter described in this specification can be implemented to realize one or more of the following advantages. A technique for computing an intensity image out of a color image is provided. The intensity image is robust to image noise while being sensitive to structures present in images, including structures present across different color channels. An intensity image pixel value scaling technique results in better feature detection for HDR images by compensating for dark and light areas of an image. An adaptive feature selection process allows the number of features detected to be based on the image size or other parameters. Due to better feature extraction, image registration accuracy is improved. Image data is transformed through a series of linear transformations that do not distort the data.

Lower resolution versions of images can be processed to improve performance. Features can be detected in image tiles that have meaningful data. Similarly, constant image tiles can be omitted from processing to further improve performance. Image tiles are small and more cache friendly which translates into an overall performance improvement. Tiling an image allows an effecting image size to be calculated based on knowing which tiles will be discarded (e.g., constant tiles). Knowing the effective image size allows the optimal image resolution to be chosen for feature detection. For example, if the effective image size is small, feature detection can be performed at a higher resolution of the image than if the effective image size is large. Image tiles can be processed in parallel. Image features in different tiles are treated equally, even though some tiles may contain more features than others. Image tile features can be thresholded independently so that features are not discarded from less busy tiles as a result of a global threshold.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 illustrates two intensity images of the same color image.

Like reference numbers and designations in the various drawings indicate like elements.

DETAILED DESCRIPTION

A digital image (which for brevity will simply be referred to as an image) does not necessarily correspond to a file. An image may be stored in a portion of a file that holds other content, in a single file dedicated to the image in question, or in multiple coordinated files. Moreover, an image can be placed into a memory without first having been persisted in a file. An image can also be streamed from one or more sources.

FIG. 1 illustrates two intensity images of the same color image. Image 102 is a grayscale image of an RGB color image 100 created using 40% of the red channel, 40% of the green channel, and 20% of the blue channel. Image 104 is a grayscale image of the RGB image 100 created by performing a principal components analysis (PCA) of the image 100 and mapping all of the pixels to a principal component. The PCA-generated image 104 has much more detail and is crisper than the image 102. As a result, the image 104 is better suited for feature detection. PCA is a statistical technique used to reduce a multi-dimensional dataset by way of a linear transformation to fewer dimensions such that the greatest variance in the data is preserved. In various implementations, PCA is used to map each full color pixel (e.g., in three channels) to a grayscale pixel value (e.g., in one channel). Images created in this fashion are robust to noise and sensitive to structures in the image, including structures that span more than one color channel. In other implementations, the L* component of an image having pixels in the CIE L*a*b* color space is used to create a grayscale image.

Figure 2:
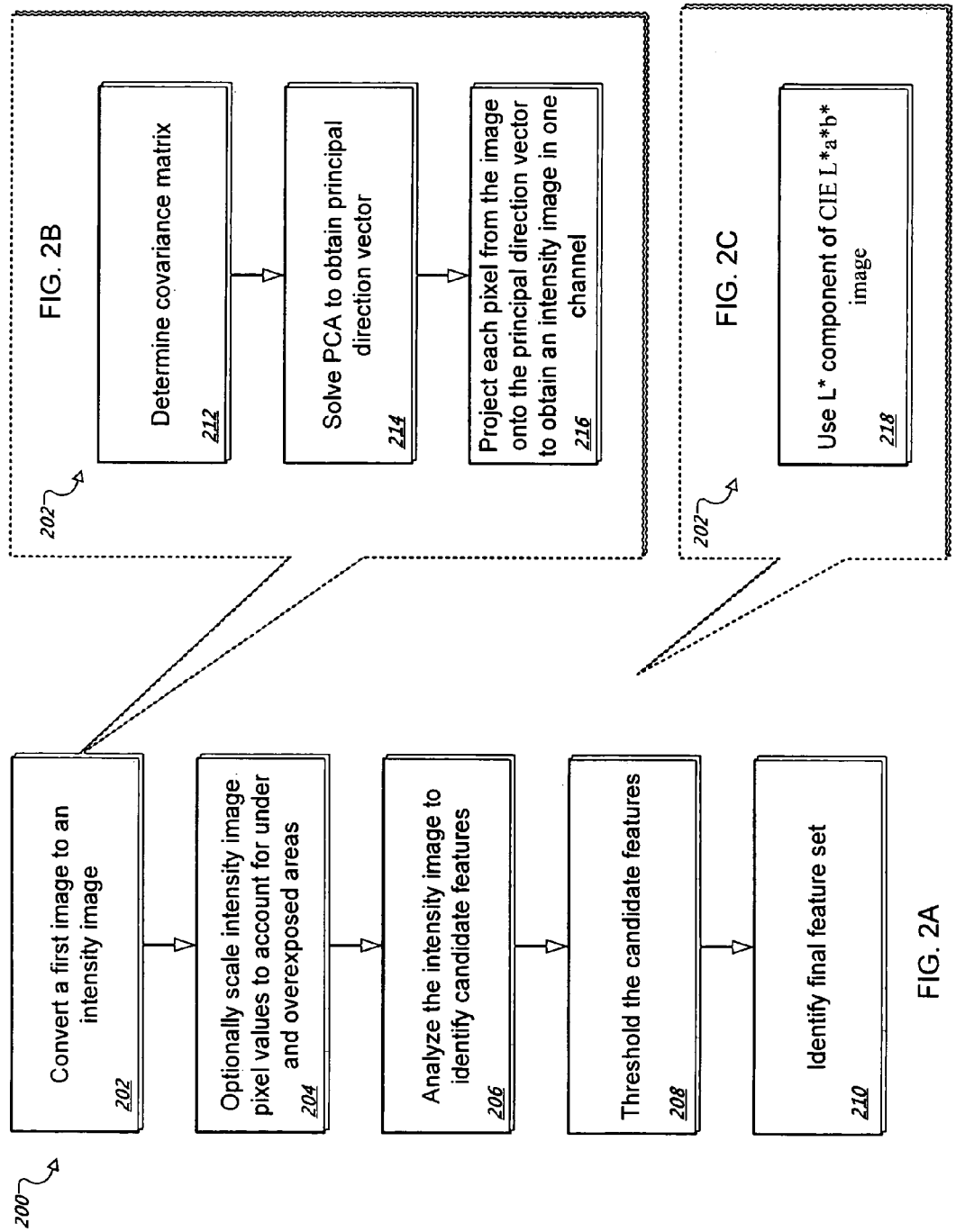
FIG. 2A is a flow chart of a method for identifying features in color and grayscale images.
FIG. 2B is a flow chart of a method for PCA conversion.
FIG. 2C is a flow chart of a method for CIE L*a*b* conversion.

FIG. 2A is a flow chart of a method 200 for identifying features in color and grayscale images. A source color image (e.g., 100) is converted to an intensity image (e.g., 104) using PCA or another technique, if the image is not already an intensity image (step 202). PCA will be explained further with reference to FIG. 2B below. Pixels that make up a color image have color values in a color space. A color space is a mathematical model describing the way colors can be represented numerically, usually as sets of numbers. In various implementations, the color space is RGB. However, other color spaces are possible including CIE L*a*b*; Cyan, Magenta, Yellow and Black (CMYK); Hue, Saturation, Value (HSV); and Hue, Saturation, Lightness/Luminance (HSL), for instance. An image whose pixel values are not in RGB color space can be converted to such using commonly available conversion techniques.

The pixel values in the intensity image are then optionally scaled to account for under and overexposed areas in the intensity image (step 204). This will be explained further with reference to FIG. 4 below. Next, the intensity image is analyzed to identify candidate features (step 206). In various implementations, candidate features are detected using a version of the Scale Invariant Feature Transformation (SIFT) technique described in *Distinctive Image Features from Scale-Invariant Keypoints*, by David G. Lowe, published in the INTERNATIONAL JOURNAL OF COMPUTER VISION 60(2), 91-110 (2004), which is incorporated herein by reference in its entirety. However, other feature detection techniques are possible such as, for example, contour based methods, intensity based methods and parametric model based methods, to name a few. An adaptive threshold is then applied to the candidate features (step 208). This will be explained further with reference to FIG. 6 below. Lastly, a final set of features are identified based on the candidate features (step 210). In various implementations, step 210 may further cull the candidate features based on other factors such as edge response. See Lowe, above. Alternatively, the final set of features is equal to the candidate features.

FIG. 2B is a flow chart of a method for the PCA conversion step 202 of the flow chart 200. The first step in the conversion is to determine a covariance matrix (step 212). In various implementations, this step is accomplished as follows. Pixel data from the source image is organized into a matrix P of dimensions M×N, where N is the number of pixels in the source image and M is the number of color channels per pixel. In this illustration, pixel values are in assumed to be in the RGB color space but, as mentioned above, other color spaces are possible. Each pixel i in the source image is represented as a vector:

$$\mathbb{P}_i = \begin{bmatrix} r_i \\ g_i \\ b_i \end{bmatrix}$$

To determine the covariance matrix, the empirical mean $\overline{\mathbb{P}}$ of P is calculated along each dimension m=1 ... M of P:

$$\mathbb{P}_m = \frac{1}{N} \sum_{n=1}^{N} \mathbb{P}_{m,n}$$

Deviations from the mean are then found by subtracting the empirical mean vector $\overline{\mathbb{P}}$ from each column of P and storing the result in the M×N matrix B:

$$B = P - \overline{P} \cdot h$$

where h is a 1×N row vector of all 1's. Finally, an M×M empirical covariance matrix C is found from the outer product of matrix B with itself:

$$\mathbb{C} = \mathbb{E}[\mathbb{B} \otimes \mathbb{B}] = \mathbb{E}[\mathbb{B} \cdot \mathbb{B}^*] = \frac{1}{N-1} \mathbb{B} \cdot \mathbb{B}^*$$

where E is the expected value operator, $\otimes$ is the outer product operator, and * is the conjugate transpose operator.

The next step in the conversion is to solve the PCA to obtain the principal direction vector (step 214). In various implementations, the PCA is solved using singular value decomposition (SVD). Note, however, that other techniques for solving the PCA are possible. The final step in the conversion is to project each pixel from the image onto the first principal component vector to obtain an intensity image in one channel (step 216). The first principal component vector has the highest eigenvalue of the solved covariance matrix.

FIG. 2C is a flow chart of an alternative method for the conversion step 202 of the flow chart 200. The CIE L*a*b* color space describes all colors visible to the human eye. The three components L*, a*, and b* represent lightness of color (L*), a position between magenta and green (a*), and a position between yellow and blue (b*), respectively. The L* component ranges between 0 for black and 100 for white. An intensity image can be created simply by using the L* component value for each pixel in a CIE L*a*b* image (step 218) as an alternative to the PCA approach.

Figure 3:
FIG. 3 illustrates two intensity images of a HDR image.

FIG. 3 illustrates two intensity images of an HDR image. HDR images pose problems for feature detection because it is difficult to detect features in very dark areas (e.g., shadows) and very bright areas (e.g., sky). Image 300 was created without scaling pixel values in the intensity image to account for under and overexposed areas. (Scaling is described in detail with reference to FIG. 4 below.) As a result, only 102 features were detected as represented by red dots in region 304. Region 304 lies between the brightest area of the image 300 and the darkest area of the image 300. Features were not detected in areas outside of the region 304. In contrast, pixel values in the intensity image were scaled in image 302 to account for bright and dark areas. Notice that far more features (a total of 448) were detected as a result. Instead of features being detected only the middle region of the image, features are also detected in the brightest and darkest areas, as represented by region 306. Increasing the number of features detected can improve the accuracy of feature registration for image stitching and merging applications, for instance.

If an image has normal exposure, scaling is most likely not required. In various implementations, if an image is underexposed, scaling entails finding the middle pixel value for the shadow region(s) of the image and scaling each pixel value in the image such that the middle pixel value for the entire image is equal to the middle pixel value for the shadow region(s). Likewise, if an image is overexposed, scaling entails finding the middle pixel value for the highlight region(s) of the image and scaling each pixel value in the image such that the middle pixel value for the entire image is equal to the middle pixel value for the highlight region(s). If separate images to be merged each contain different highlight and shadow regions, the images can be scaled individually before feature detection in order to maximize the number of potential common features. Other techniques for scaling images are possible.

Figure 4:
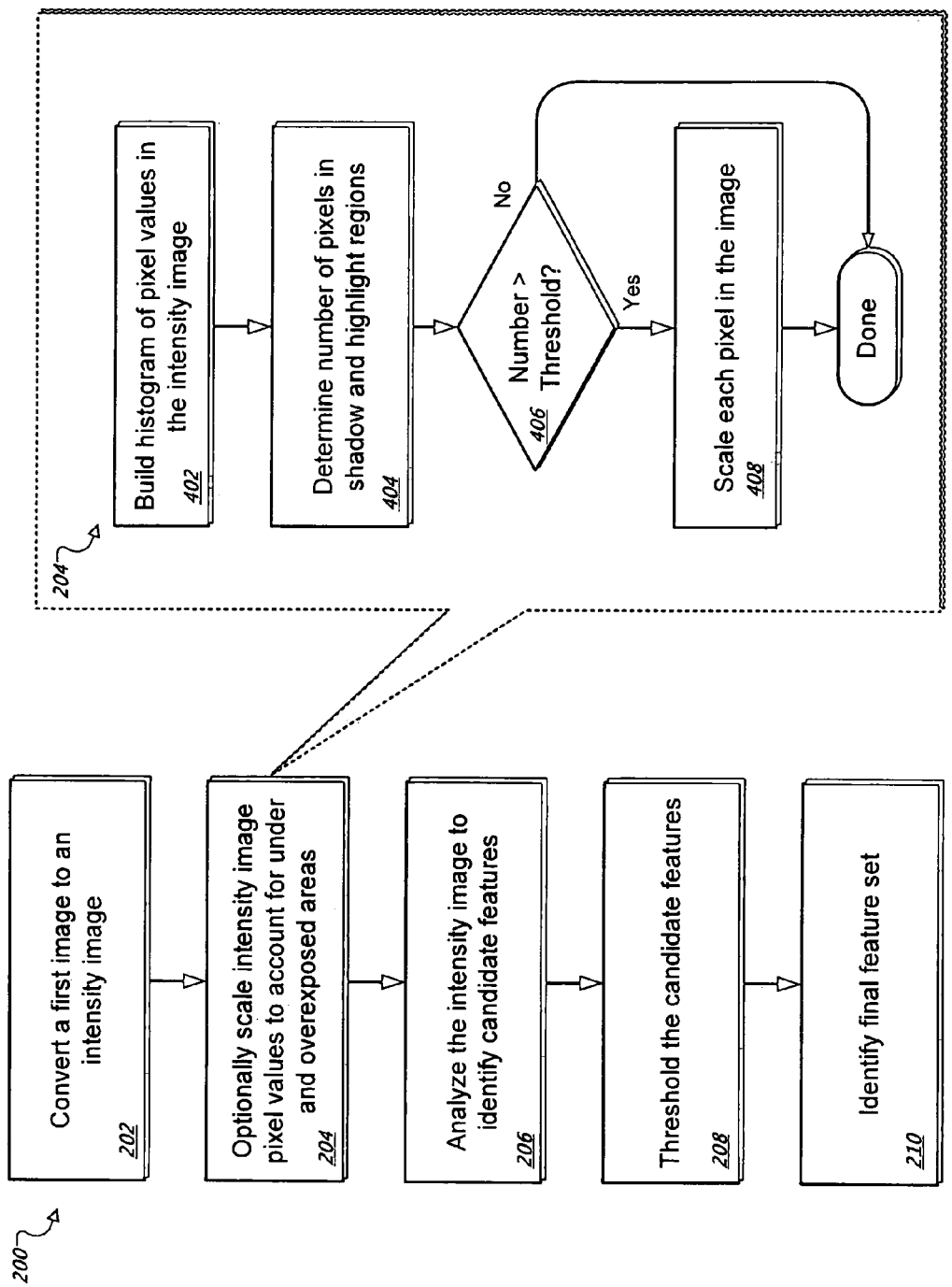
FIG. 4 is a flow chart of a method for the scaling pixel values.

FIG. 4 is a flow chart of a method for the optional scaling step 204 of the flow chart 200. A histogram of pixel values in the intensity image is constructed (step 402). The number of pixels in shadow or highlight regions of the intensity image is then determined (step 404). In various implementations, shadow and highlight regions constitute the bottom and top 25% pixel values, respectively, but other ranges are possible. If the number of pixels in shadow or highlight regions is greater than a threshold number of pixels in the image (step 406), each pixel value in the image is scaled to bring it into a new range (step 408), as described above. In various embodiments, the threshold number of pixels is 40%. Other thresholds are possible and the threshold can be user-settable.

Figure 5:
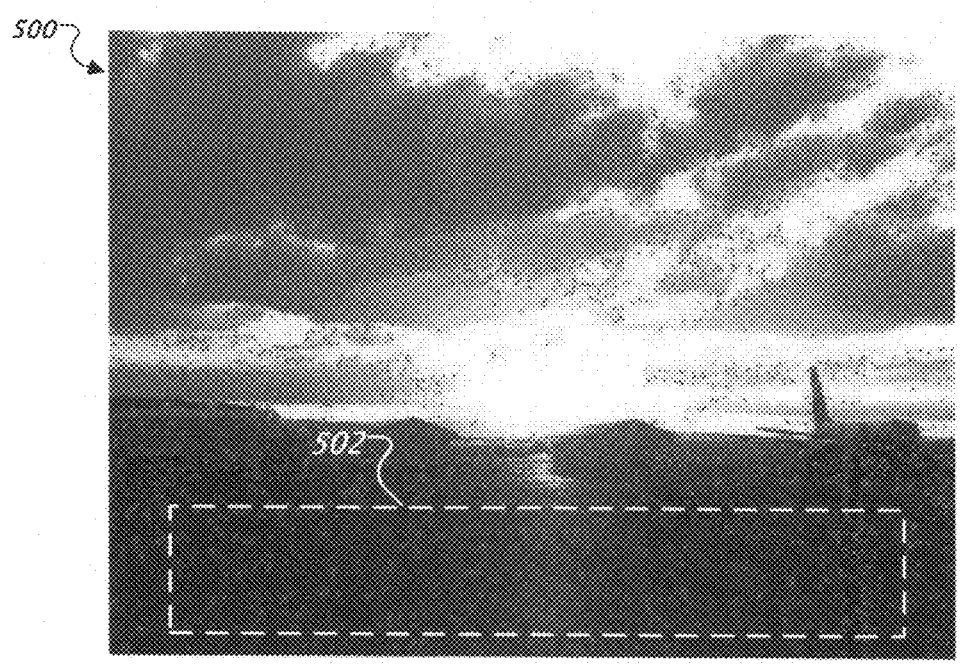
FIG. 5 illustrates an image with adaptive feature thresholding applied.

FIG. 5 illustrates the scaled intensity image of 302 with adaptive thresholding applied as part of feature detection. In total, 2785 features were detected which is much higher than the original 448 features detected without adaptive thresholding. Adaptive thresholding retains as many features as possible to improve image alignment. In various implementations, users can select one or more regions of an image (e.g., 502) to associate a weight with features detected in the regions. This can be used to indicate to subsequent processing steps (e.g., merging, stitching) what features should be given priority. In other implementations, one or more user-selected regions indicate what region(s) of an image feature detection will or will not be performed in. In yet further implementations, user-selected regions of an image are used to indicate what features should be given priority during adaptive thresholding. This will be described in relation to FIG. 6.

Figure 6:
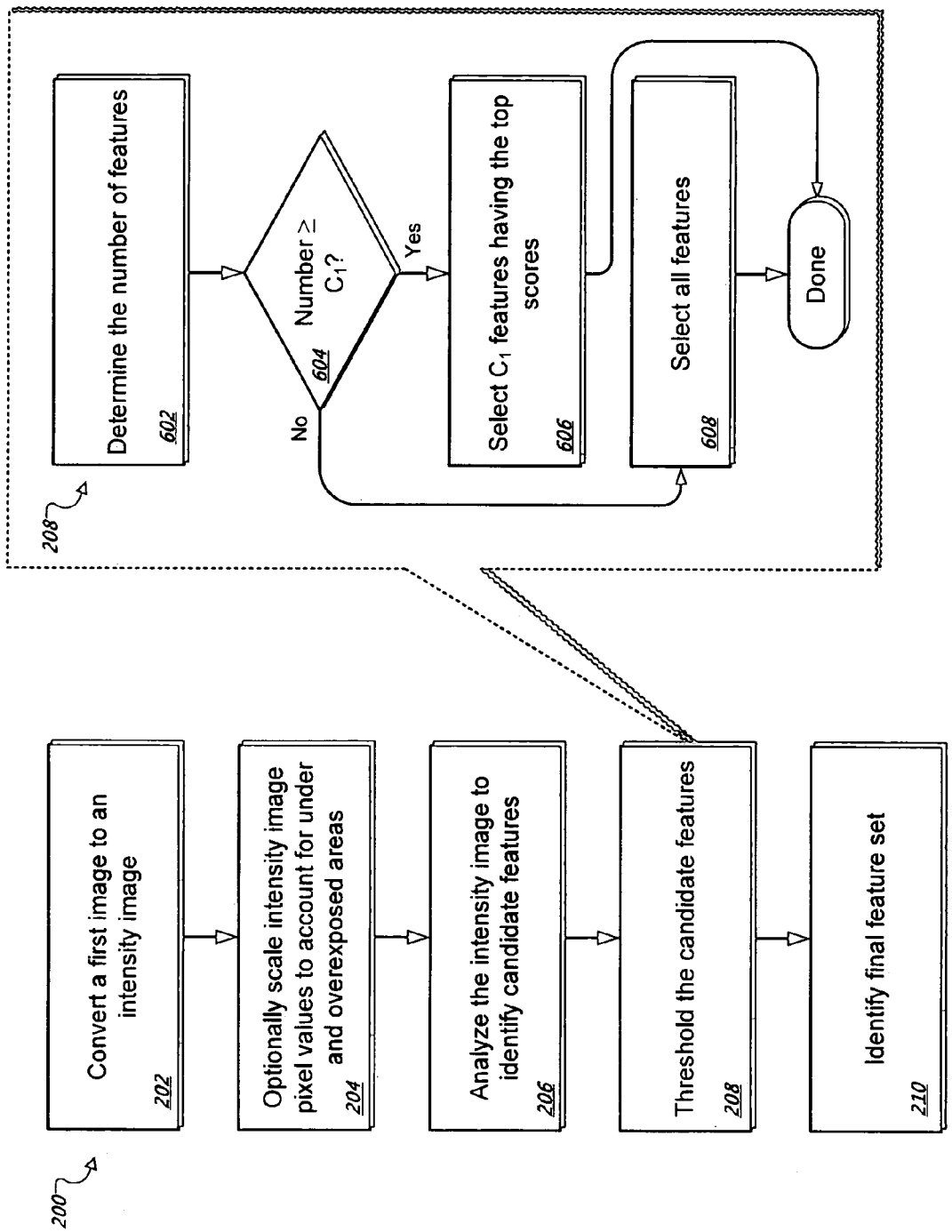
FIG. 6 is a flow chart of a method for adaptive feature thresholding.

FIG. 6 is a flow chart of a method for the adaptive threshold step 208 of the flow chart 200. In this method, the SIFT technique is modified so that it works better with HDR images by utilizing adaptive feature selection. An extremum $\hat{x}$ (or "keypoint") in the SIFT technique is an indication of an image feature. The SIFT technique discards extrema that have a low contrast based on the assumption that such extrema are more sensitive to noise. The function value at an extremum, $D(\hat{x})$, is used to identify extrema with low contrast and returns a value in the range [0,1]:

$$D(\hat{x}) = D + \frac{1}{2} \frac{\partial D^T}{\partial x} \hat{x}$$

In the Lowe paper (incorporated by reference above), all extrema having a $D(\hat{x})$ value or score that is less than 0.03 are discarded. However, this fixed constant can be too restrictive for HDR images.

FIG. 6 presents an alternative to Lowe's fixed threshold. The first step in applying an adaptive threshold is to determine the number of features (step 602). The number of features counted in step 602 is compared to $C_1$. In various implementations, the threshold $C_1$ is determined based on the size of the image, the image exposure, other factors, or combinations of these. For example, a threshold of 500 can yield, on average, a feature for every 20×20 square of pixels in a one mega pixel image. If the number of features is greater than or equal to $C_1$, the $C_1$ features having the top scores $D(\hat{x})$ are selected as candidates (step 606). Otherwise, all features are selected as candidates (step 608). In various implementations, features that occur in user-selected image regions (e.g., 502) are given priority during adaptive thresholding over features in non-selected regions. For example, candidate features can be taken from user-selected regions first (regardless of their scores) to satisfy the $C_1$ threshold in step 606 so that features in non-selected regions are more likely to be discarded.

Figure 7A:
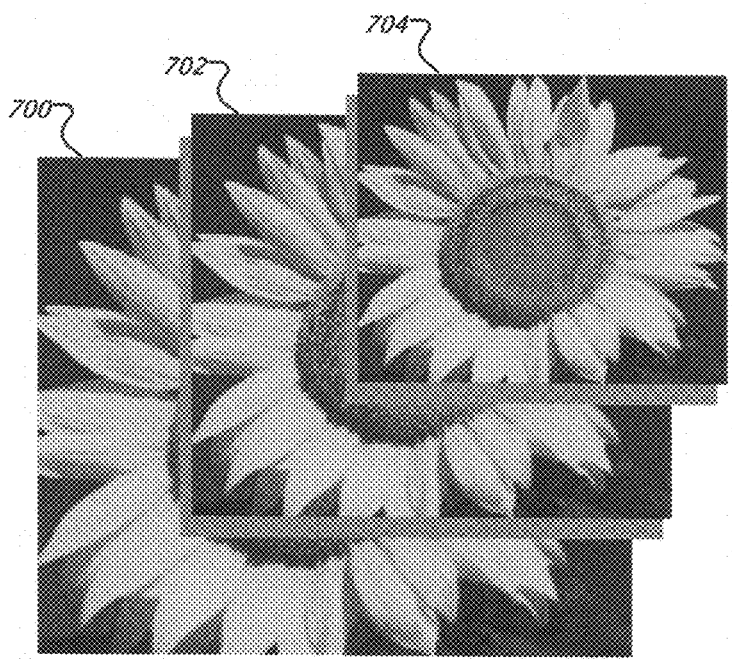
FIG. 7A is an illustration of lower resolutions of the same image.

FIG. 7A is an illustration of lower resolutions of the same image. A full resolution image 700 can be down sampled to create one or more lower resolution version of the image (e.g., 702, 704). For example, image 702 is a lower resolution of image 700, and image 704 is a lower resolution of image 702. The techniques and methods described above can be applied to a lower resolution versions of images with the feature detection results being mapped to the original images. This enables potentially faster operation and requires less memory than operating on full resolution images. In various implementations, the transformation of a given image to a lower resolution image is linear. As explained above, linear transformations of image data prevent the data from being distorted.

Figure 7B:
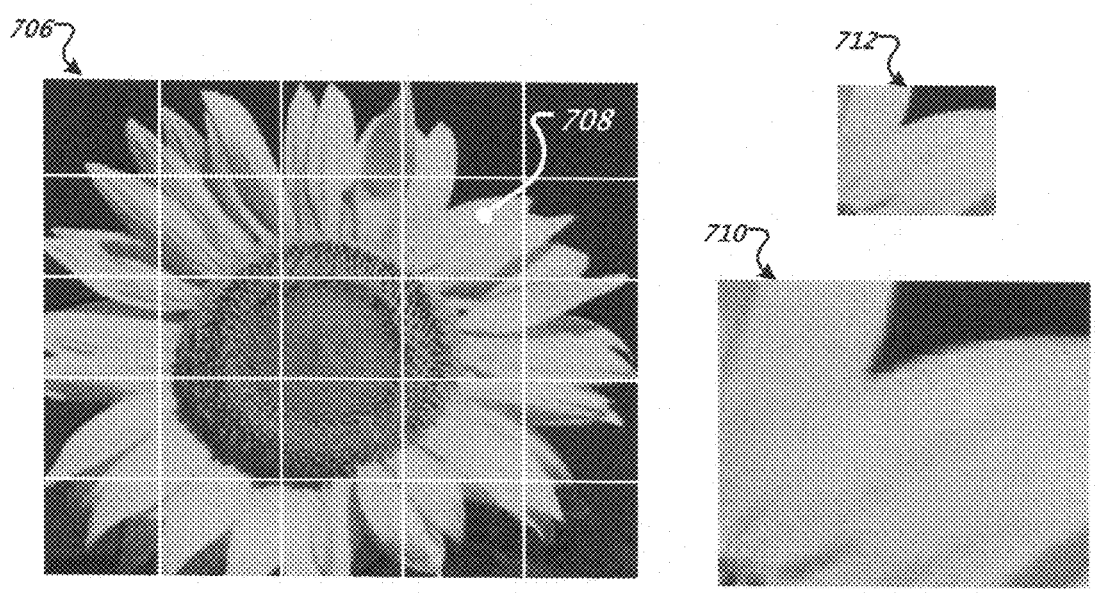
FIG. 7B is an illustration of image tiling.

FIG. 7B is an illustration of image tiling. An image can be divided into tiles of equal or non-equal sizes. Tiles can be processed using the techniques and methods described above. Tiles can be processed serially or in parallel to improve performance. Another performance improvement can be realized if the pixels in a tile are all in a cache, which is likely if the tile is small enough. Further performance improvements can be realized if lower resolution versions of tiles are processed. For example, tile 708 can be processed at full resolution (710) or at a lower resolution (712).

In various implementations, if it is determined that a given tile is constant (i.e., each pixel has the same color value or grayscale value), the tile is omitted from processing since such tiles do not have any detectable features. Some application programs such as Adobe Photoshop from Adobe Systems Incorporated of San Jose, Calif., automatically identify constant image tiles in metadata associated with images. Ignoring constant tiles can improve performance by reducing the amount of data that needs to be processed. Tiling an image also allows an effecting image size to be calculated based on knowing which tiles will be discarded (e.g., constant tiles). Knowing the effective image size allows the optimal image resolution to be chosen for feature detection. For example, if the effective image size is small, feature detection can be performed at the higher resolution of the image.

In further implementations, adaptive thresholding (FIG. 6) can be applied separately to each image tile so that features in each tile are thresholded independently of other tiles instead of using a global threshold. This prevents features in busy tiles from being favored over features in less busy tiles.

Figure 8:
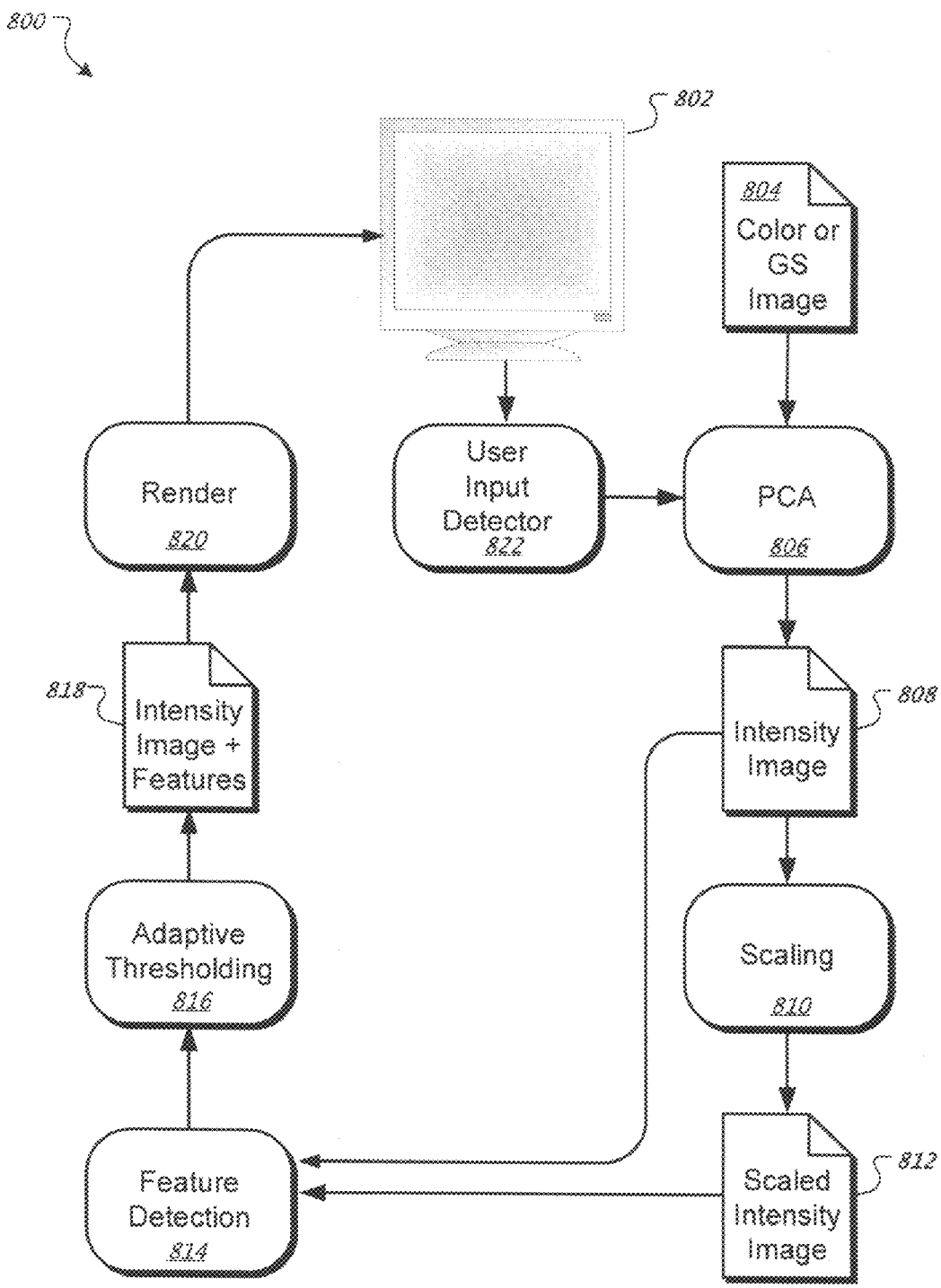
FIG. 8 illustrates a system for identifying features in color and grayscale images.

FIG. 8 illustrates a system 800 for identifying features in color and grayscale images as might be implemented in an image manipulation system or other interactive application. Although several modules are illustrated, there may be fewer or more modules in the system 800. Moreover, the modules can be distributed on one or more computing devices connected by one or more networks or other suitable communication means.

A user can interact with the system 800 through a computer 802 or other device. For example, the computer 802 can be a computer terminal within a local area network (LAN) or wide area network (WAN). In particular, the user may be utilizing the system 800 to stitch or merge two or more images. A user input detector 822 receives a signal from an interactive graphical user interface (or other process) reflecting a user's desire to perform feature detection on a color or grayscale image 804. In various implementations, the graphical user interface is provided by Adobe Photoshop. The input detector 822 provides an identification of the image 804 to a PCA module 806. The PCA module 806 performs PCA on the image 804 to generate an intensity image 808. Pixel values in the intensity image are then optionally scaled by a scaling module 810 if such scaling is warranted, as described above. The scaling module 810 creates a scaled intensity image 812 which is provided to a feature detection module 814 which performs SIFT on the image 812 to find extrema indicative of features. An adaptive threshold is applied to the extrema by an adaptive thresholding module 816 to determine the final set of features. An intensity image along with detected features 818 is then provided to a render module 820 which causes a representation of the image 818 to be presented on the device 802.

Figure 9:
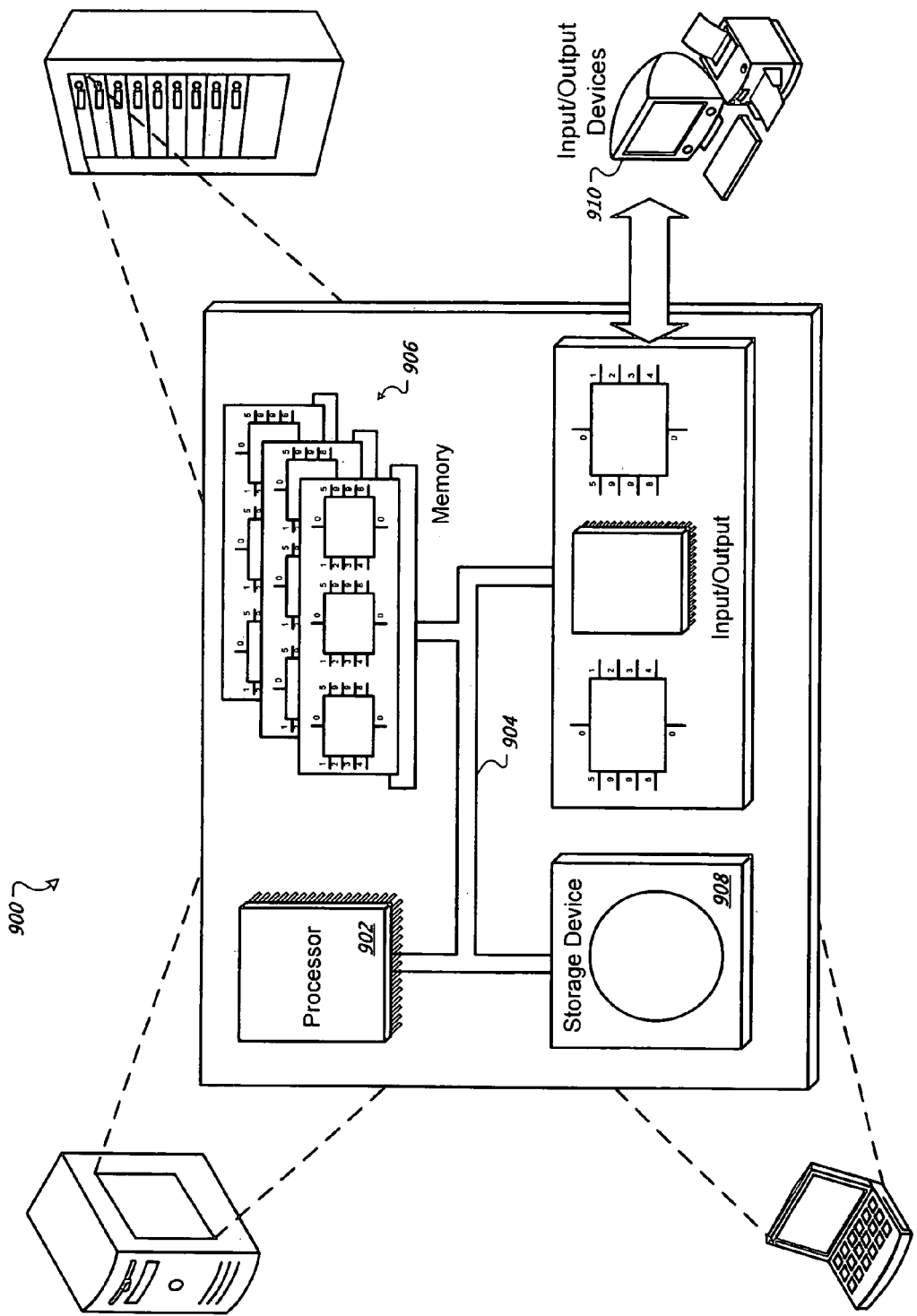
FIG. 9 is a schematic diagram of a generic computer system.

FIG. 9 is a schematic diagram of a generic computer system 900. The system 900 can be used for practicing operations described in association with the systems, methods and techniques described above. The system 900 can include one or more processors 902, memories 906, storage devices 908, and input/output devices 910. Each of the components 902, 906, 908 and 910 are interconnected using one or more system buses 904. The processor 902 is capable of processing instructions for execution within the system 900. Such executed instructions can implement one or more modules of system 800, for example. The processor 902 can be single or multi-threaded, single or multi-core, or combinations of these, for example. The processor 902 is capable of processing instructions stored in the memory 906 or on the storage device 908 to display graphical information for a user interface on the input/output device 910, for instance.

The memory 906 is a computer readable medium such as volatile or non volatile random access memory that stores information within the system 900. The memory 906 could store data structures representing intensity images (e.g., 808, 812 and 818) and detected features. The storage device 908 is capable of providing persistent storage for the system 900. The storage device 908 may be a floppy disk device, a flash memory, a hard disk device, an optical disk device, or a tape device, or other suitable persistent storage means. The input/output device 910 provides input/output operations for the system 900. In various implementations, the input/output device 910 includes a keyboard and/or pointing device and a display unit for displaying graphical user interfaces. Software modules as described with reference to FIG. 8 such as 822, 806, 810, 814, 816 and 820 can be persisted in storage device 908, memory 906 or can be obtained over a network connection, to name a few examples.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
converting a first image to an intensity image using principal components analysis where the intensity image is based on a first principal component;
receiving user selection of one or more regions of the intensity image;
analyzing the intensity image to identify a plurality of scale invariant features in the intensity image where a subset of the plurality of identified features are in the one or more user selected regions, each identified feature associated with a score;
altering at least one score associated with an identified feature in the one or more user selected regions; and
applying an adaptive threshold to the identified features to establish a set of features for the first image, wherein the altered scores are utilized to establish the set of features for the first image.

2. The method of claim 1 where the intensity image includes a plurality of pixels and each pixel is associated with a respective intensity value, the method further comprising:
determining a number of pixels in the intensity image that represent underexposed or overexposed areas of the first image based on the respective intensity values; and
if the number of pixels is above a threshold, scaling the respective intensity values of the plurality of pixels to a middle intensity value.

3. The method of claim 1 where applying the threshold includes:
discarding identified features whose respective scores are below a threshold.

4. The method of claim 1 where applying the threshold includes:
determining a desired number of features based on a size of the first image; and
keeping the desired number of identified features whose respective scores are highest.

5. The method of claim 1, where:
the first image is a lower resolution version of a second image; and
the method further comprises mapping the set of features from the first image to the second image.

6. The method of claim 1, further comprising:
identifying a non-constant tile in a second image; and
using the non-constant tile as the first image.

7. The method of claim 1, where:
the first image is a non-constant tile in a second image, the second image being larger than the first image.

8. The method of claim 1 where the first image is in one of the following color spaces:
RGB, CIE L*a*b*, CMYK, HSL, HVL, grayscale, or black and white.

9. The method of claim 1 where:
the first image includes a plurality of tiles; and
wherein the converting step further comprises converting each of the plurality of tiles in parallel to an intensity image including a plurality of tiles and the analyzing step further comprises analyzing each of the plurality of tiles included in the intensity image in parallel to identify a plurality of scale invariant features in the intensity image.

10. The method of claim 9 where:
the adaptive threshold is applied to each tile independently.

11. The method of claim 1, where the one or more regions indicate one or more areas of the first image where feature detection will or will not be performed.

12. The method of claim 1 where:
the one or more regions indicate one or more areas of the first image where features will be given priority when applying the adaptive threshold.

13. A computer-implemented method, comprising:
converting a first CIE L*a*b* image to an intensity image using an L* component of the image;
receiving user selection of one or more regions of the intensity image;
analyzing the intensity image to identify a plurality of scale invariant features in the intensity image where a subset of the plurality of identified features are in the one or more user selected regions, each identified feature associated with a score;
altering at least one score associated with an identified feature in the one or more user selected regions; and
applying an adaptive threshold to the identified features to establish a set of features for the first image, wherein the altered scores are utilized to establish the set of features for the first image.

14. The method of claim 13 where the intensity image includes a plurality of pixels and each pixel is associated with a respective intensity value, the method further comprising:
determining a number of pixels in the intensity image that represent underexposed or overexposed areas of the first image based on the respective intensity values; and
if the number of pixels is above a threshold, scaling the respective intensity values of the plurality of pixels to a middle intensity value.

15. The method of claim 13 where applying the threshold includes:
discarding identified features whose respective scores are below a threshold.

16. The method of claim 13 where applying the threshold includes:
determining a desired number of features based on a size of the first image; and
keeping the desired number of identified features whose respective scores are highest.

17. The method of claim 13, where:
the first image is a lower resolution version of a second image; and
the method further comprises mapping the set of features from the first image to the second image.

18. The method of claim 13, further comprising:
identifying a non-constant tile in a second image; and
using the non-constant tile as the first image.

19. The method of claim 13, where:
the first image is a non-constant tile in a second image, the second image being larger than the first image.

20. The method of claim 13 where:
the first image includes a plurality of tiles; and
wherein the converting step further comprises converting each of the plurality of tiles in parallel to an intensity image including a plurality of tiles and the analyzing step further comprises analyzing each of the plurality of tiles included in the intensity image in parallel to identify a plurality of scale invariant features in the intensity image.

21. The method of claim 20 where:
the adaptive threshold is applied to each tile independently.

22. The method of claim 13, where the one or more regions indicate one or more areas of the first image where feature detection will or will not be performed.

23. The method of claim 13 where:
the one or more regions indicate one or more areas of the first image where features will be given priority when applying the adaptive threshold.

24. A computer program product, encoded on a non-transitory computer-readable storage device, operable to cause data processing apparatus to perform operations comprising:
converting a first image to an intensity image using principal components analysis where the intensity image is based on a first principal component;
receiving user selection of one or more regions of the intensity image;
analyzing the intensity image to identify a plurality of scale invariant features in the intensity image where a subset of the plurality of identified features are in the one or more user selected regions, each identified feature associated with a score;
altering at least one score associated with an identified feature in the one or more user selected regions; and
applying an adaptive threshold to the identified features to establish a set of features for the first image, wherein the altered scores are utilized to establish the set of features for the first image.

25. The program product of claim 24 where the intensity image includes a plurality of pixels and each pixel is associated with a respective intensity value, the program product further comprising:
determining a number of pixels in the intensity image that represent underexposed or overexposed areas of the first image based on the respective intensity values; and
if the number of pixels is above a threshold, scaling the respective intensity values of the plurality of pixels to a middle intensity value.

26. The program product of claim 24 where applying the threshold includes:
determining a desired number of features based on a size of the first image; and
keeping the desired number of identified features whose respective scores are highest.

27. The program product of claim 24, where:
the first image is a lower resolution version of a second image; and
the method further comprises mapping the set of features from the first image to the second image.

28. The program product of claim 24, where the one or more regions indicate one or more areas of the first image where feature detection will or will not be performed.

29. The program product of claim 24 where:
the one or more regions indicate one or more areas of the first image where features will be given priority when applying the adaptive threshold.

30. A computer program product, encoded on a non-transitory computer-readable storage device, operable to cause data processing apparatus to perform operations comprising:
converting a first CIE L*a*b* image to an intensity image using an L* component of the image;
receiving user selection of one or more regions of the intensity image;
analyzing the intensity image to identify a plurality of scale invariant features in the intensity image where a subset of the plurality of identified features are in the one or more user selected regions, each identified feature associated with a score;
altering at least one score associated with an identified feature in the one or more user selected regions; and
applying an adaptive threshold to the identified features to establish a set of features for the first image, wherein the altered scores are utilized to establish the set of features for the first image.

31. The program product of claim 30 where the intensity image includes a plurality of pixels and each pixel is associated with a respective intensity value, the program product further comprising:
determining a number of pixels in the intensity image that represent underexposed or overexposed areas of the first image based on the respective intensity values; and
if the number of pixels is above a threshold, scaling the respective intensity values of the plurality of pixels to a middle intensity value.

32. The program product of claim 30 where applying the threshold includes:
determining a desired number of features based on a size of the first image; and
keeping the desired number of identified features whose respective scores are highest.

33. The program product of claim 30, where:
the first image is a lower resolution version of a second image; and
the method further comprises mapping the set of features from the first image to the second image.

34. The program product of claim 30, where the one or more regions indicate one or more areas of the first image where feature detection will or will not be performed.

35. The program product of claim 30 where:
the one or more regions indicate one or more areas of the first image where features will be given priority when applying the adaptive threshold.

36. A system for detecting image features, the system comprising:
a display for presenting a target display window to a user;
one or more control interfaces configured to receive input from the user; and
processor electronics configured to perform operations comprising:
converting a first image to an intensity image using principal components analysis where the intensity image is based on a first principal component;
receiving user selection of one or more regions of the intensity image;
analyzing the intensity image to identify a plurality of scale invariant features in the intensity image where a subset of the plurality of identified features are in the one or more user selected regions, each identified feature associated with a score;
altering at least one score associated with an identified feature in the one or more user selected regions; and
applying an adaptive threshold to the identified features to establish a set of features for the first image, wherein the altered scores are utilized to establish the set of features for the first image.

37. The system of claim 36 where the intensity image includes a plurality of pixels and each pixel is associated with a respective intensity value, the system further comprising:
determining a number of pixels in the intensity image that represent underexposed or overexposed areas of the first image based on the respective intensity values; and if the number of pixels is above a threshold, scaling the respective intensity values of the plurality of pixels to a middle intensity value.

38. The system of claim 36 where applying the threshold includes:
discarding identified features whose respective scores are below a threshold.

39. The system of claim 36 where applying the threshold includes:
determining a desired number of features based on a size of the first image; and
keeping the desired number of identified features whose respective scores are highest.

40. The system of claim 36, where:
the first image is a lower resolution version of a second image; and
the method further comprises mapping the set of features from the first image to the second image.

41. The system of claim 36, further comprising:
identifying a non-constant tile in a second image; and
using the non-constant tile as the first image.

42. The system of claim 36, where:
the first image is a non-constant tile in a second image, the second image being larger than the first image.

43. The system of claim 36 where the first image is in one of the following color spaces:
RGB, CIE L*a*b*, CMYK, HSL, HVL, grayscale, or black and white.

44. The system of claim 36 where:
the first image includes a plurality of tiles; and
the adaptive threshold is applied to each tile independently.

45. The system of claim 36, the one or more regions indicate one or more areas of the first image where feature detection will or will not be performed.

46. The system of claim 36 where:
the one or more regions indicate one or more areas of the first image where features will be given priority when applying the adaptive threshold.

* * * * *